_United States Patent Office_

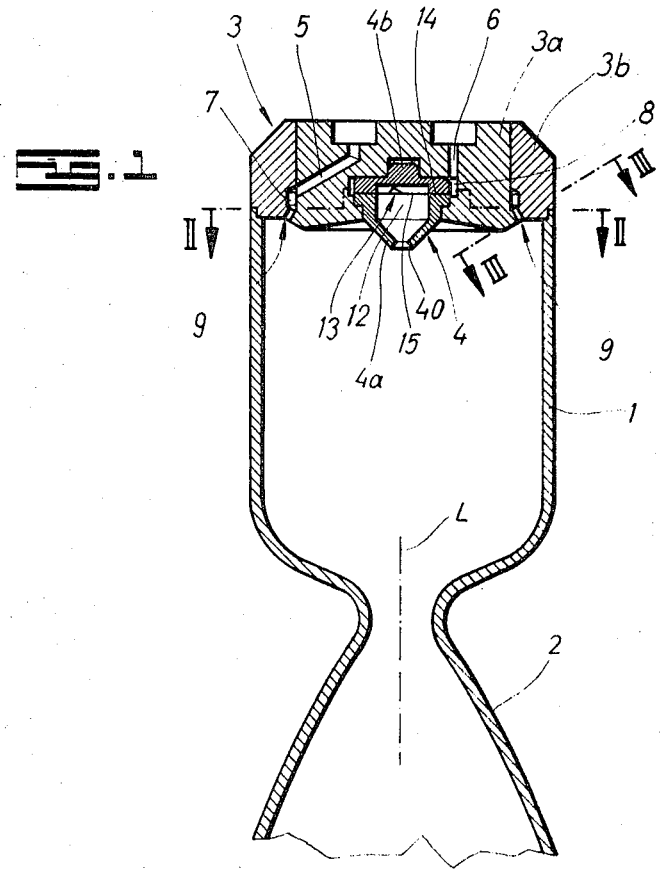
Fig. 1
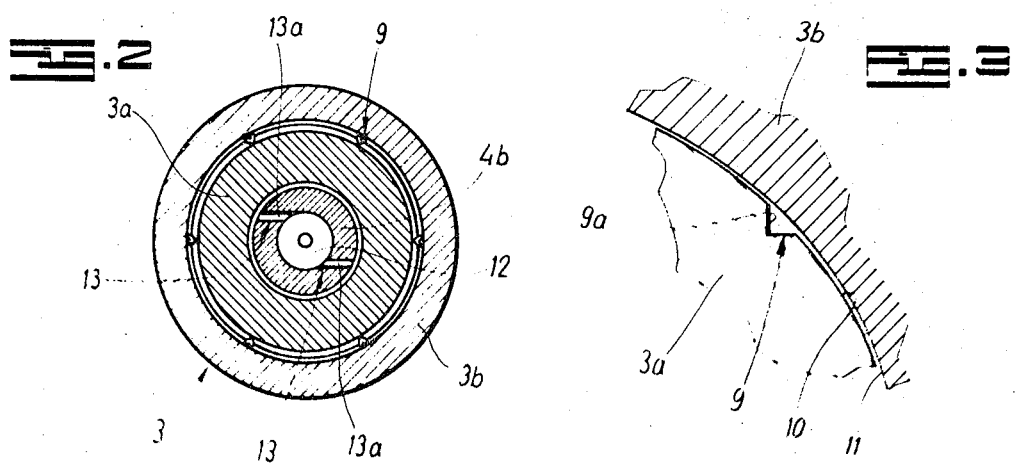
Fig. 2
Fig. 3
INVENTOR
German Munding

3,546,883
Patented Dec. 15, 1970

3,546,883
LIQUID FUEL ROCKET ENGINE CONSTRUCTION
German Munding, Bad Friecrichshall, Germany, assignor to Bolkow Gesellschaft mit beschrankter Haftung, Ottobrunn, near Munich, Germany
Filed June 5, 1968, Ser. No. 734,597
Claims priority, application Germany, June 8, 1967, B 92,913
Int. Cl. F02k 9/02
U.S. Cl. 60—258    7 Claims

ABSTRACT OF THE DISCLOSURE

A liquid fuelled rocket engine construction includes a combustion chamber having a head portion which is formed of an inner solid cylindrical part and an outer annular part. In addition, the central inner cylindrical part carries a nozzle member which is formed of two mating parts. The construction includes fuel ducts which supply fuel to the outer periphery of the combustion chamber walls and also a nozzle fuel duct which supplies fuel tangentially into the swirl chamber defined within the nozzle member. The fuel ducts are formed between two mating parts of the nozzle member and the outer and inner parts of the head of the combustion chamber. A groove is formed in one of the parts and the opposite mating wall of the other of the parts forms the completed boundary enclosing the duct for the fuel.

SUMMARY OF THE INVENTION

This invention relates in general to the construction of rocket engines and in particular to a new and useful rocket engine construction having a head portion with an outer annular part and an inner cylindrical part and a central nozzle member of two-part construction within the inner cylindrical part, the two parts of the nozzle member and the two parts of the head portion forming fuel ducts by respective grooves formed in one of each set of parts and a bounding wall of the other of the parts of each set closing the groove.

In liquid rocket engines it is known to provide a head construction with passages for introducing the liquid propellant components radially obliquely and tangentially into the combustion chamber adjacent the head. Such channels are continuously supplied with fresh propellant through separate external connecting passages defined as annular ducts. In the known case, the channels are formed as bores which extend within a one-piece combustion chamber head. For engines of relatively large dimensions it is comparatively easy to produce such channels by drilling with a drilling tool. However, because the dimensions of the structural parts are rather small or even of miniature size, the classic drilling method can no longer practically achieve the desired passage formations. Modern machine methods such as electron ray welding can be used only conditionally and for some applications and in any event such methods still involve high engineering costs and are generally too expensive to carry out on an industrial production basis.

In accordance with the present invention there is provided a rocket engine construction and particularly a head formation which permits the simple completion of the connecting passages of very small dimensions at comparatively small cost and using simple machining methods. This is achieved by defining connecting passages or ducts for fuel between two juxtaposed parts, one of which is machined to define the necessary groove for the fuel passage and the other of which forms the wall boundary closing off one side or top of the groove.

A liquid rocket engine constructed in accordance with the invention includes an annular head portion and an inner cylindrical head portion and the fuel is advantageously supplied through passages defined in the inner head portion which lead one to an annular connecting passage defined between the inner and outer head portions and the other to a tangential passage defined between two nozzle parts of a swirl nozzle assembly contained in a recess in the inner head portion. With such an arrangement it is only necessary to machine a groove in one of the juxtaposed parts of the annular outer head portion and inner head portion and of one of the two nozzle forming parts in order to effect the desired fuel duct passages or channels. The other of the two parts forms the bounding wall closing off this side of the passage and need not be machined in any particular way.

A plurality of channels for one of the liquid propellant components such as an oxygen carrier is formed by two mutually corresponding conical ring areas of two combustion chamber head parts. The channels extend in axial planes.

For the formation and arrangement of the channel for the second liquid propellant, two mutually corresponding ring areas of two nozzle parts which together form a swirl nozzle are correspondingly formed. One of the parts is provided with a groove which extends normal to the longitudinal axis of the combustion chamber and the other part closes the end of this groove. The groove opens tangentially into a swirl chamber defined within the interior of the nozzle.

The invention makes it possible to provide a channel or bore of relatively small size for the directing of a fuel component therethrough. This is done merely by forming a depression such as by grinding with a disk-shaped tool in one of the parts which are to be juxtaposed. Thus, with the invention it is only necessary to employ the classic methods available for machining of a single ring area in a single part only, the other part which is to be juxtaposed therewith forming a cover. This permits accuracy of machining and maintenance of high quality over the entire length of the duct which is formed.

Accordingly it is an object of the invention to provide a construction of fuel component passages in a device such as a rocket engine which is formed by two juxtaposed parts, one of which is machined to define the passage depth and the other of which forms a cover for the passage.

A further object of the invention is to provide a rocket engine construction which includes a head portion made of two more parts which fit together and define a connecting passage for fuel, one of the parts being machined to form the groove and the other of the parts forming a cover.

A further object of the invention is to provide a rocket engine construction which includes a head portion comprising an outer annular part and an inner cylindrical part having a recess therein for receiving a nozzle member, the nozzle member being made of two parts which fit together to form a swirl chamber, said central head portion defining a connecting passage to the nozzle member and the inner and outer passages of the head together defining a fuel for admitting fuel around the periphery of the interior wall of the combustion chamber, the two nozzle parts together defining connecting passages for the swirl admission into the nozzle member of a fuel component, only one of the parts of the head and the nozzle member being machined to define a groove.

A further object of the invention is to provide a combustion chamber construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIG. 1 is a partial longitudinal sectional view of a rocket engine combustion chamber constructed in accordance with the invention;

FIG. 2 is a section taken along the line II—II of FIG. 1; and

FIG. 3 is a section taken along the line III—III of FIG. 1.

DETAILED DESCRIPTION OF THE PREFERRED EMBODIMENT

Referring to the drawings in particular, the invention embodied therein comprises a rocket engine combustion chamber which includes a combustion chamber casing 1 having a thrust nozzle portion 2 and discharge at one end and closed at its opposite end by a head generally designated 3.

In accordance with the invention, the head 3 comprises a central cylindrical head portion 3a and an annular head portion 3b. The central head portion 3a is provided with a central interior recess in which is arranged an injection nozzle assembly generally designated 4 which is designed as a swirl nozzle. Naturally, the nozzle assembly 4 and the central head portion 32 are made so as to permit the insertion of the nozzle assembly into the central recess of the head portion. For this reason, for example, the head portion may be made of two or more parts or segments which are assembled around the nozzle assembly 4 or the nozzle portion itself may be made of two or more parts which may be assembled into the recess of the head portion.

In the embodiment illustrated, two liquid propellant components which are required for the operation of the combustion chamber are supplied through inflow passages or bores 5 and 6, respectively. The passages 5 and 6 extend through the central head portion 3a and connect two annular spaces or feed ducts 7 and 8, respectively. The annular duct 7 is provided with a plurality of connecting channels 9 distributed around its circumference which open into the interior of the combustion chamber and are advantageously arranged to direct the fuel component in a whirling tangential direction around the walls.

In accordance with one aspect of the invention, the channels 9 are formed between two conical ring areas 10 and 11 defined by opposing surfaces of the inner head portion 3a and the outer head portion 3b. The ring area 10 is provided with triangular channel depressions 9a to form the channel or duct and the ring area 11 provides a planar cover closing the opposite side of the duct. The channel 9 thus formed is directed obliquely against the combustion chamber wall. Because of the oblique orientation and the triangular form of the channel cross sections, a good distribution of the fuel component in the form of a film which hugs the walls is achieved. The construction permits a film-like expansion of the liquid jets on the inside of the combustion chamber wall inasmuch as they approach the combustion chamber wall substantially with their radially outwardly pointed base of the triangle.

In a similar manner, the injection nozzle assembly 4 is formed of at least two parts, including a mouthpiece part 4a having a discharge 40 opening into the combustion chamber and a bottom part 4b which together enclose a swirl chamber 12. The separating area between the parts 4a and 4b provide ring areas which extend normal to the longitudinal axis L of the combustion chamber. A plurality of channels generally designated 13 are defined adjacent the separation plane of the two parts 4a and 4b and they open tangentially into the swirl chamber 12. The channels 13 include channel depressions 13a which may be machined in only one ring area 14 of the bottom part 4b (FIG. 2). The ring area 15 is then made flat without any depressions and provides a covering for the channel.

Thus, the invention makes it possible to form communicating channels and distribution ducts for the fuel components without expensive machine drilling of each of the parts. The depressions 9a and 13a can be machined out of exposed ring areas 10 and 14 in a simple manner and with the use of an ordinary grinding disk.

While a specific embodiment of the invention has been shown and described in detail to illustrate the application of the inventive principles, it will be understood that the invention may be embodied otherwise without departing from such principles.

What is claimed is:

1. A liquid rocket engine combustion chamber construction, comprising wall means defining a combustion chamber having a nozzle section and thrust gas discharge and a closed head portion, at least one propellant component passage defined in said head portion, said head portion including two juxtaposed parts, one of which is provided with a groove defining a first propellant component channel connected between said propellant component passage and said combustion chamber and the other of which defines a cover closing said first propellant component channel, said head portion including a central cavity, and a swirl nozzle assembly in said central cavity of said head portion, said swirl nozzle assembly including two juxtaposed parts, each part having a ring area in engagement, one of said ring areas defining a second propellant component channel groove, the other of said ring areas defining a cover for said second propellant component channel groove.

2. A liquid rocket engine combustion chamber construction according to claim 1, wherein said second propellant component grooves extend tangentially into the interior of said nozzle assembly, said nozzle assembly having an interior swirl chamber connected tangentially to said second propellant component groove, said second fuel component groove being connected to said head portion to fuel supply passage for directing the fuel tangentially into said nozzle swirl chamber.

3. A liquid rocket engine combustion chamber construction, comprising wall means defining a combustion chamber having a nozzle section and a thrust gas discharge and a close head portion, at least one propellant component passage defined in said head portion, said head portion including two juxtaposed parts, one of which is provided with a groove defining a first propellant component channel connected between said propellant component passage and said combustion chamber and the other of which defines a cover closing said first propellant component channel, said head portion comprising an inner cylindrical head portion and an outer annular head portion, said inner cylindrical head portion having a central cavity, and a nozzle swirl chamber assembly within said central cavity comprising two nozzle parts juxtaposed at two nozzle part ring areas, one of said nozzle part ring areas having a second groove defining a second propellant component channel, the other of said ring areas having a surface defining a cover for said second propellant component channel, said second component channel opening tangentially into said swirl chamber.

4. A liquid rocket engine combustion chamber construction comprising a generally cylindrical wall defining a combustion chamber portion a nozzle section and a divergent discharge section of a combustion chamber, a head portion closing the inner end of said combustion chamber, said head portion comprising an inner substantially cylindrical head part and an outer annular head part surrounding said inner head part, said inner head part having a plurality of propellant component passage defined therein, said outer annular head part having an annular duct communicating with one of said propellant component passages, said inner and outer head parts having juxtaposed ring areas adjacent to and connecting said annular duct, one of said ring areas having a first propellant channel defined therein, the other of said ring areas forming a cover for said first propellant channel, said propellant component channel extending from said duct inwardly to said combustion chamber, said inner head portion including a cavity having a swirl nozzle assembly therein centrally arranged in respect to said combustion chamber and with a discharge opening into said combustion chamber, said swirl nozzle asembly comprising two nozzle parts with juxtaposed ring areas, one of which has a channel defining a second propellant component channel connected to one of said fuel passages in said head portion, the other ring area defining a cover for said channel.

5. A liquid rocket engine combustion chamber construction according to claim 4, wherein said channels of said first and second propellant component channels are machined into said ring areas.

6. A liquid rocket engine combustion chamber construction comprising a generally cylindrical wall defining a combustion chamber portion, a nozzle section and a divergent discharge section of a combustion chamber, a head portion closing the inner end of said combustion chamber, said head portion comprising an inner substantially cylindrical head part and an outer annular head part surrounding said inner head part, said inner head part having a plurality of propellant component passages defined therein, said outer annular head part having an annular duct communicating with one of said propellant component passages, said inner and outer head parts having juxtaposed ring areas adjacent to and connecting said annular duct, said ring area of said cylindrical head part having a propellant channel defined therein extending at an angle to the central axis of said combustion chamber in a direction to discharge the propellant component flowing therein against the interior of the cylindrical wall of said combustion chamber adjacent said head portion, the other of said ring areas forming a cover for said propellant channel, said propellant component channel extending from said duct inwardly to said combustion chamber, and nozzle means carried by said inner head part for directing another propellant component into said combustion chamber and being connected to one of said propellant component passages of said inner head part.

7. A method of forming a combustion chamber head comprising forming the head of two interengaging head parts with one of the parts having a ring area of a configuration to interengage with a ring area of the other of said parts, machining one of the parts to form a groove in the ring area thereof, arranging the parts together so that the ring areas are juxtaposed and the ring area of the unmachined part forms a cover for the groove of the machined part, forming a nozzle assembly of two parts having ring areas which are adapted to interengage in a form-fitting arrangement by machining one of the nozzle ring areas to provide a groove for a propellant component, and arranging the nozzle parts together within the head part so that the other ring area forms a cover for the groove propellant component channel which is formed.

References Cited

UNITED STATES PATENTS

| | | | |
|---|---|---|---|
| 2,453,378 | 11/1948 | Lubbock | 60—258 |
| 2,532,711 | 12/1950 | Goddard | 60—39.74 |
| 2,667,740 | 2/1954 | Goddard | 60—258 |
| 2,896,914 | 7/1959 | Ryan | 60—258 |
| 3,067,582 | 12/1962 | Schirmer | 60—39.74 |
| 3,137,445 | 6/1964 | Hirschfeld | 60—39.74 |

FOREIGN PATENTS

| | | | |
|---|---|---|---|
| 962,391 | 4/1957 | Germany | 60—39.74 |
| 1,080,820 | 4/1960 | Germany | 60—258 |
| 1,298,648 | 6/1962 | France | 60—258 |

DOUGLAS HART, Primary Examiner

U.S. Cl. X.R.

29—157; 60—39.74